US012750569B2

(12) United States Patent
Jung et al.

(10) Patent No.: US 12,750,569 B2
(45) Date of Patent: Sep. 29, 2026

(54) NOISE REMOVAL FROM SURVEILLANCE CAMERA IMAGE BY MEANS OF AI-BASED OBJECT RECOGNITION

(71) Applicant: HANWHA VISION CO., LTD., Seongnam-si (KR)

(72) Inventors: Youngje Jung, Seongnam-si (KR); Eunjeong Kim, Seongnam-si (KR); Chansoo Oh, Seongnam-si (KR); Sangwook Lee, Seongnam-si (KR); Jaewoon Byun, Seongnam-si (KR); Seongha Jeon, Seongnam-si (KR); Yeongeun Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/806,130

(22) Filed: Aug. 15, 2024

(65) Prior Publication Data

US 2024/0414443 A1 Dec. 12, 2024

Related U.S. Application Data

(63) Continuation of application No. PCT/KR2023/002181, filed on Feb. 15, 2023.

(30) Foreign Application Priority Data

Feb. 16, 2022 (KR) ........................ 10-2022-0020109

(51) Int. Cl.
*H04N 23/00* (2023.01)
*G06V 10/26* (2022.01)
(Continued)

(52) U.S. Cl.
CPC ............. *H04N 23/00* (2023.01); *G06V 10/26* (2022.01); *G06V 10/82* (2022.01); *G06V 20/52* (2022.01);
(Continued)

(58) Field of Classification Search
CPC ........ H04N 23/00; H04N 23/61; H04N 23/71; H04N 23/72; H04N 23/74; H04N 7/18;
(Continued)

(56) References Cited

U.S. PATENT DOCUMENTS

| | | | |
|---|---|---|---|
| 6,038,337 | A | 3/2000 | Lawrence et al. |
| 2005/0057666 | A1 | 3/2005 | Hu et al. |

(Continued)

FOREIGN PATENT DOCUMENTS

| | | | |
|---|---|---|---|
| KR | 10-1228338 B1 | 1/2013 | |
| KR | 10-2020-0044182 A | 4/2020 | |
| KR | 10-2021-0083997 A | 7/2021 | |

OTHER PUBLICATIONS

International Search Report and Written Opinion (PCT/IB/373, PCT/ISA/210, and PCT/ISA/237) dated May 16, 2023, in International Application No. PCT/KR2023/002181.

(Continued)

*Primary Examiner* — Shadan E Haghani
(74) *Attorney, Agent, or Firm* — Sughrue Mion, PLLC

(57) ABSTRACT

A surveillance camera includes a camera including a plurality of IR LEDs corresponding to a plurality of illumination areas; and at least one processor configured to: partition an image acquired through the camera into a plurality of blocks, determine a brightness of an object block including at least one block that includes an object among the plurality of blocks, and control a brightness of at least one target IR LED, among the plurality of IR LEDs, corresponding to an illumination area that includes the object block based on the brightness of the object block.

17 Claims, 13 Drawing Sheets

(51) Int. Cl.

| | |
|---|---|
| ***G06V 10/82*** | (2022.01) |
| ***G06V 20/52*** | (2022.01) |
| ***H04N 23/61*** | (2023.01) |
| ***H04N 23/71*** | (2023.01) |
| ***H04N 23/72*** | (2023.01) |
| ***H04N 23/74*** | (2023.01) |

(52) U.S. Cl.
CPC ............. *H04N 23/61* (2023.01); *H04N 23/71* (2023.01); *H04N 23/72* (2023.01); *H04N 23/74* (2023.01)

(58) Field of Classification Search
CPC ........ H04N 7/181; H04N 23/20; H04N 23/56; H04N 23/60; H04N 23/70; H04N 23/76; G06V 10/26; G06V 10/82; G06V 20/52; G06V 10/141; G06V 10/25; G06N 3/08; G06T 5/92; G06T 7/11
See application file for complete search history.

(56) References Cited

U.S. PATENT DOCUMENTS

| | | | | |
|---|---|---|---|---|
| 2005/0065655 | A1* | 3/2005 | Hong | G05D 1/0234 700/245 |
| 2007/0122036 | A1* | 5/2007 | Kaneda | G06V 10/454 382/190 |
| 2016/0345400 | A1 | 11/2016 | Shih et al. | |
| 2018/0012374 | A1 | 1/2018 | Fujita et al. | |
| 2019/0364182 | A1* | 11/2019 | Yamakage | F21V 5/002 |
| 2020/0154027 | A1 | 5/2020 | Van Der Sijde et al. | |
| 2020/0164814 | A1 | 5/2020 | Solar et al. | |
| 2021/0166000 | A1* | 6/2021 | Maeda | G06V 10/141 |
| 2021/0195081 | A1* | 6/2021 | Verma | H04N 23/74 |
| 2021/0350145 | A1 | 11/2021 | Park et al. | |
| 2023/0050340 | A1* | 2/2023 | Yang | H04N 23/74 |

OTHER PUBLICATIONS

European Extended Search Report issued Apr. 15, 2025 by the European Patent Office for EP Patent Application No. 23756617.9.

* cited by examiner

NOISE REMOVAL FROM SURVEILLANCE CAMERA IMAGE BY MEANS OF AI-BASED OBJECT RECOGNITION

CROSS-REFERENCE TO RELATED APPLICATION(S)

This application is a continuation of International Application No. PCT/KR2023/002181, filed on Feb. 15, 2023, in the Korean Intellectual Property Receiving Office, which is based on and claims priority to Korean Patent Application No. 10-2022-0020109, filed on Feb. 16, 2022, in the Korean Intellectual Property Office, the disclosures of which are incorporated by reference herein in their entireties.

BACKGROUND

1. Field

The present disclosure relates to an apparatus and a method for processing surveillance camera images.

2. Description of Related Art

A surveillance camera system operating in an environment with limited external light may be equipped with an infrared projector outside or inside the surveillance camera to recognize and photograph subjects in a dark environment.

However, as the surveillance range is increased, a larger number of infrared light emitting diodes (LEDs) may be used; continuous operation of infrared LEDs may generate significant heat due to their inherent characteristics, which may lead to reduced lifespan and cause rupture of the LEDs.

For a site monitored by a surveillance camera, it may be beneficial to maintain the required level of brightness at all times, even when people and objects, the primary surveillance targets, are not always present. However, the use of high-power infrared LED light may require significant power consumption, leading to issues such as generation of heat inside the camera and heat noise on the screen.

On the other hand, if the infrared LED light is turned off or its brightness is reduced, the surveillance target may not be identified. Moreover, as the screen brightness diminishes, the auto exposure (ΔE) amplification increases, leading to amplified sensor noise on the screen.

Therefore, a method is needed to reduce camera power consumption while maintaining sufficient brightness for object recognition in extremely low-light environments.

SUMMARY

Recently, artificial intelligence-based object recognition technology has significantly improved the false alarm problem in the recognition of motion data of objects.

Accordingly, to solve the problem above, the present disclosure provides a surveillance camera and a control method for the surveillance camera capable of efficiently reducing AE amplification gain while maintaining low power consumption by selectively controlling the infrared LEDs and/or AE according to the presence or absence of an object based on the AI-based object recognition result.

The present disclosure further provides a surveillance camera and a control method for the surveillance camera capable of increasing the object recognition rate and reducing power consumption by controlling the brightness of at least part of the infrared LEDs (in what follows, referred to as IR LEDs) provided in the surveillance camera according to the location of an object.

Additional aspects will be set forth in part in the description which follows and, in part, will be apparent from the description, or may be learned by practice of the presented embodiments. Technical problems to be solved by the present disclosure are not limited to those mentioned above, and other technical problems not mentioned may be apparent to a person having ordinary knowledge in the technical field to which the present disclosure pertains from the following detailed description of the present disclosure.

According to an aspect of the disclosure, a surveillance camera may include: a camera including a plurality of IR LEDs corresponding to a plurality of illumination areas; and at least one processor configured to: partition an image acquired through the camera into a plurality of blocks, determine a brightness of an object block including at least one block that includes an object among the plurality of blocks, and control a brightness of at least one target IR LED, among the plurality of IR LEDs, corresponding to an illumination area that includes the object block based on the brightness of the object block.

Based on an arrangement of the plurality of IR LEDs, an image capture area of the surveillance camera is divided into a plurality of areas according to respective illumination areas of the plurality of IR LEDs.

The at least one processor may be further configured to: partition the image into M×N blocks, each block including a plurality of pixels.

The at least one processor may be further configured to: determine an average brightness of the each block based on a brightness of the plurality of pixels, determine an average brightness of the object block based on the average brightness of the each block, and control the brightness of the target IR LED based on the average brightness of the object block and a predetermined reference brightness.

The at least one processor may be further configured to: based on the brightness of the target IR LED being less than a reference brightness, compensate for the brightness of the object block by amplifying a gain of an image sensor included in the camera.

The at least one processor may be further configured to: determine an amount of gain amplification of the image sensor according to the brightness of the object block.

The at least one processor may be further configured to: based on a location of the object block being recognized in the image, determine the at least one target IR LED corresponding to the location of the object block, and control the brightness of the at least one target IR LED.

The at least one processor may be further configured to: turn off IR LEDs that do not correspond with the at least one target IR LED among the plurality of IR LEDs.

The at least one processor may be further configured to: dynamically change the at least one target IR LED for brightness control among the plurality of IR LEDs according to a location of the object block in the image.

The at least one processor may be further configured to: recognize the object using a deep learning-based object recognition algorithm, assign an ID to each recognized object, extract coordinates of the object to which the ID is assigned, and match the coordinates of the object to coordinates of the at least one block that include the object.

According to an aspect of the disclosure, a surveillance camera may include: a camera including a plurality of IR LEDs; and at least one processor configured to: recognize an object through a deep learning-based object recognition algorithm from an image obtained through the camera, determine at least one target IR LED corresponding to coordinate information of the object among the plurality of IR LEDs, and control a brightness of the at least one target IR LED based on brightness information of the object.

The plurality of IR LEDs may be provided around a lens of the camera, where a surveillance area of the surveillance camera is divided into a plurality of areas in the image according to illumination areas of the plurality of IR LEDs, and where the at least one processor is further configured to: group the plurality of IR LEDs into groups of at least one IR LED corresponding to the plurality of areas, determine a group corresponding to the coordinate information of the object, and control the brightness of the at least one IR LED included in the determined group.

The plurality of areas may include areas corresponding to corners of the image and an area corresponding to a center of the image.

The at least one processor may be further configured to: partition the image into a plurality of blocks, determine a brightness of an object block including at least one block that includes the object among the plurality of blocks, and control the brightness of the at least one target IR LED based on the brightness of the object block.

The at least one processor may be further configured to: determine an average brightness of each block based on a brightness of a plurality of pixels included in the each block, determine an average brightness of the object block based on the average brightness of the each block, and control the brightness of the at least one target IR LED based on the average brightness of the object block and a predetermined reference brightness.

The at least one processor may be further configured to: based on the brightness of the target IR LED being less than the reference brightness, compensate for the brightness of the object block by amplifying a gain of an image sensor included in the camera.

The at least one processor may be further configured to: dynamically change the at least one target IR LED among the plurality of IR LEDs according to the coordinate information of the object, and control a brightness of at least one IR LED, not included in the at least one target IR LED, to have a brightness lower than the brightness of the at least one target IR LED.

According to an aspect of the disclosure, a control method for a surveillance camera may include: partitioning an image acquired from a camera including a plurality of IR LEDs corresponding to a plurality of illumination areas into a plurality of blocks; recognizing an object through a deep learning-based object recognition algorithm; determining a brightness of an object block including at least one block that includes the object among the plurality of blocks; and controlling a brightness of at least one target IR LED, among the plurality of IR LEDs, corresponding to an illumination area that includes the object block based on the brightness of the object block.

Based on an arrangement of the plurality of IR LEDs, an image capture area of the surveillance camera is divided into a plurality of areas according to respective illumination areas of the plurality of IR LEDs, where the method further includes: obtaining a location of the object and a location of the object block; determining the at least one target IR LED corresponding to the illumination area that includes the location of the object block among the plurality of IR LEDs; and controlling the brightness of the at least one target IR LED based on a predetermined reference brightness.

The control method may further include: compensating for the brightness of the object block by amplifying a gain of an image sensor included in the camera based on the brightness of the target IR LED being less than the reference brightness.

BRIEF DESCRIPTION OF DRAWINGS

The above and other aspects, features, and advantages of certain embodiments of the present disclosure will be more apparent from the following description taken in conjunction with the accompanying drawings, in which.

The accompanying drawings, which are included as part of the detailed description to help the understanding of the present disclosure, provide one or more embodiments of the present disclosure, and explain the technical features of the present disclosure together with the detailed description.

DETAILED DESCRIPTION

Hereinafter, embodiments of the disclosure will be described in detail with reference to the attached drawings. The same or similar components are given the same reference numbers and redundant description thereof is omitted. The suffixes “module” and “unit” of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as “first”, “second”, etc., may be used to describe various components, such components must not be limited by the above terms. The above terms are used only to distinguish one component from another.

When an element is “coupled” or “connected” to another element, it should be understood that a third element may be present between the two elements although the element may be directly coupled or connected to the other element. When an element is “directly coupled” or “directly connected” to another element, it should be understood that no element is present between the two elements.

The singular forms are intended to include the plural forms as well, unless the context clearly indicates otherwise.

In addition, in the specification, it will be further understood that the terms “comprise,” “include,” “have” and the like specify the presence of stated features, integers, steps, operations, elements, components, and/or combinations thereof, but do not preclude the presence or addition of one or more other features, integers, steps, operations, elements, components, and/or combinations.

As used herein, each of the expressions “A or B,” “at least one of A and B,” “at least one of A or B,” “A, B, or C,” “at least one of A, B, and C,” and “at least one of A, B, or C,” may include one or all possible combinations of the items listed together with a corresponding expression among the expressions.

Figure 1:
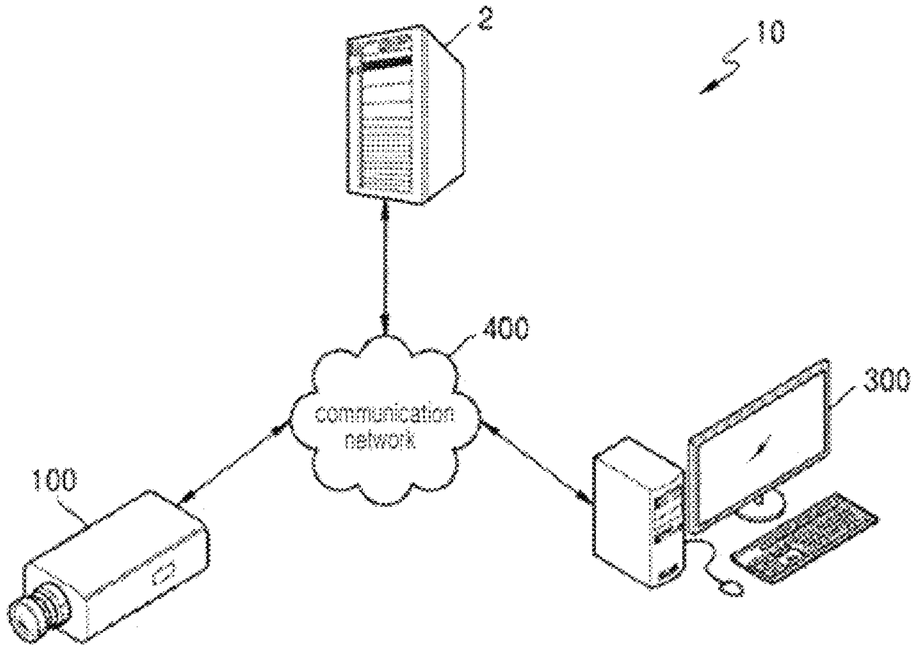
FIG. 1 is a diagram illustrating a surveillance camera system for implementing a surveillance camera controlling method according to an embodiment of the present disclosure.

FIG. 1 is a diagram illustrating a surveillance camera system for implementing a surveillance camera controlling method according to an embodiment of the present disclosure.

Referring to FIG. 1, a surveillance camera system 10 according to an embodiment of the present disclosure may include an image capture device 100 and an image management server 200. The image capture device 100 may be an electronic imaging device disposed at a fixed location in a specific place, may be an electronic imaging device that can be moved automatically or manually along a predetermined path, or may be an electronic imaging device that can be moved by a person or a robot. The image capture device 100 may be an IP (Internet protocol) camera connected to the wired/wireless Internet and used. The image capture device 100 may be a PTZ (pan-tilt-zoom) camera having pan, tilt, and zoom functions. The image capture device 100 may have a function of recording a monitored area or taking a picture. The image capture device 100 may have a function of recording a sound generated in a monitored area. When a change, such as movement or sound, occurs in the monitored area, the image capture device 100 may have a function of generating a notification or recording or photographing. The image capture device 100 may receive and store the trained object recognition learning model from the image management server 200. Accordingly, the image capture device 100 may perform an object recognition operation using the object recognition learning model.

The image management server 200 may be a device that receives and stores an image as it is captured by the image capture device 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network mode.

The image management server 200 may store various learning models suitable for an image analysis purpose. In addition to the learning model for object detection described above, a model for obtaining a movement speed of a detected object may be stored. Here, the trained models may include a learning model that outputs a gain value for a sensor to compensate for a shutter speed corresponding to a movement speed of an object or to compensate for brightness as the shutter speed is controlled. In addition, the trained models may be implemented as a learning model that is trained to detect a motion blur intensity based on a movement speed of an object analyzed through an AI object recognition algorithm and to output an optimal shutter speed and/or sensor gain value for a shooting environment that causes the detected motion blur intensity. Any of the aforementioned models may be implemented as a single model, or may be implemented as a plurality of models.

In addition, the image management server 200 may analyze the received image to generate metadata and index information for the corresponding metadata. The image management server 200 may analyze image information and/or sound information included in the received image together or separately to generate metadata and index information for the metadata.

The surveillance camera system 10 may further include an external device 300 capable of performing wired/wireless communication with the image capture device 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

The surveillance camera system 10 may further include a communication network 400 that is a wired/wireless communication path between the image capture device 100, the image management server 200, and/or the external device 300. The communication network 400 may include, for example, a wired network such as LANs (Local Area Networks), WANs (Wide Area Networks), MANs (Metropolitan Area Networks), ISDNs (Integrated Service Digital Networks), and a wireless network such as wireless LANs, CDMA, Bluetooth, and satellite communication, but the scope of the present disclosure is not limited thereto.

Figure 2:
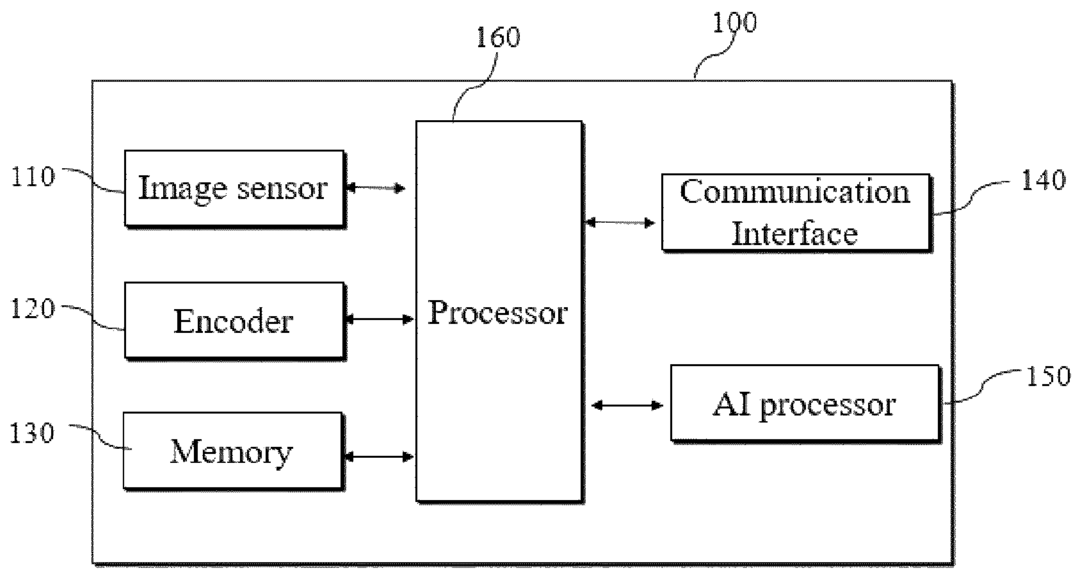
FIG. 2 is a block diagram illustrating a surveillance camera according to an embodiment of the present disclosure.

FIG. 2 is a block diagram illustrating a surveillance camera according to an embodiment of the present disclosure FIG. 2 is a block diagram illustrating a configuration of the camera shown in FIG. 1. Referring to FIG. 2, as an example, a camera 100 may be implemented as a network camera that performs an intelligent image analysis function and generates a signal of the image analysis, but the operation of the network surveillance camera system according to an embodiment of the present disclosure is not limited thereto.

The camera 100 may include an image sensor 110, an encoder 120, a memory 130, a communication interface 140, AI processor 150, a processor 160.

The image sensor 110 may perform a function of acquiring an image by photographing a surveillance region, and may be implemented with, for example, a CCD (Charge-Coupled Device) sensor, a CMOS (Complementary Metal-Oxide-Semiconductor) sensor, and the like.

The encoder 120 may perform an operation of encoding the image acquired through the image sensor 110 into a digital signal, based on, for example, H.264, H.265, MPEG (Moving Picture Experts Group), M-JPEG (Motion Joint Photographic Experts Group) standards or the like.

The memory 130 may store image data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image may be generated together with the text-based metadata and stored in the memory 130, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance area detected for a specific region and a specific period, and may be transmitted in real time together with the text-based metadata.

The communication interface 140 may transmit the image data, audio data, still image, and/or metadata to the external device 300. The communication interface 140 according to an embodiment may transmit image data, audio data, still images, and/or metadata to the external 300 in real time. The communication interface 140 may perform at least one communication function among wired and wireless LAN (Local Area Network), Wi-Fi, ZigBee, Bluetooth, and Near Field Communication.

The AI processor 150 may be used for an artificial intelligence image processing and apply a deep learning based object detection algorithm which is learned in the image acquired through the surveillance camera system according to an embodiment of the present disclosure. The AI processor 150 may be implemented as an integral module with the processor 160 that controls the overall system or an independent module. According to one or more embodiments of the present disclosure, a YOLO (You Only Lock Once) algorithm may be applied for an object recognition. YOLO is an AI algorithm proper for the surveillance camera that processes an image in real time due to the fast object detection speed. Different from the other object based algorithms (Faster R-CNN, R_FCN, FPN-FRCN, etc.), the YOLO algorithm may output a classification probability of a bounding box which indicates a position of each object by interpreting the result of passing through a single neural network after resizing a sheet of input image. Finally, the YOLO algorithm may detect a single object through a non-max suppression.

The object detection algorithm disclosed in one or more embodiments is not limited to YOLO described above, but may be implemented with various deep learning algorithms.

The learning model for object recognition applied to the present disclosure may be a model trained by defining coordinate information of an object in an image as training data. Accordingly, image data may be used as input for the trained model, while output data may include coordinate information of an object included within the image data and/or location information of a block including the object when the image is partitioned into blocks of predetermined size.

According to the present disclosure, if an object's location is detected, only the IR LEDs corresponding to the location of the object may be selected, and their brightness is selectively controlled, which reduces power consumption and improves the object recognition rate.

Figure 3:
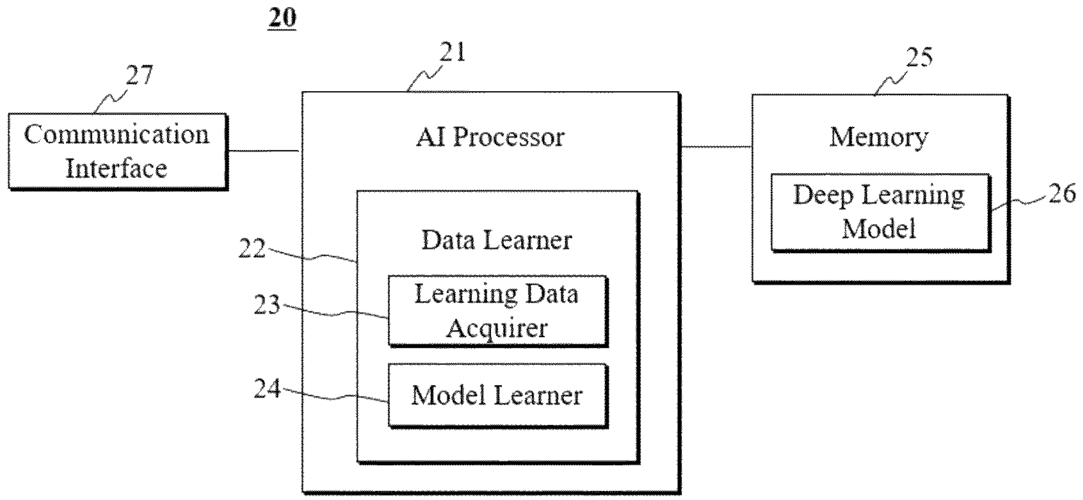
FIG. 3 is a diagram for explaining an AI (artificial intelligence) device (module) applied to training of the object recognition model according to an embodiment of the present disclosure.

FIG. 3 is a diagram for explaining an AI (artificial intelligence) device (module) applied to training of the object recognition model according to one embodiment of the present disclosure.

Referring to FIG. 3, the AI device 20 may include an electronic device including an AI module capable of performing AI processing, or a server including an AI module. In addition, the AI device 20 may be included the image capture device 100 or the image management server 200 as at least a part thereof to perform at least a part of AI processing together.

The AI processing may include operations related to a control of the image capture device or the image management server. For example, the image capture device or the image management server may AI-process the obtained image signal to perform processing/determination and control signal generation operations.

The AI device 20 may be a client device that directly uses the AI processing result or a device in a cloud environment that provides the AI processing result to other devices. The AI device 20 may be implemented as a computing device capable of learning a neural network, and may be implemented in various electronic devices such as a server, a desktop PC, a notebook PC, and a tablet PC.

The AI device 20 may include an AI processor 21, a memory 25, and/or a communication interface 27.

AI processor 21 may train a neural network using a program stored in the memory 25. AI processor 21 may train a neural network for recognizing a related data of the surveillance camera. Here, the neural network for recognizing data related to image capture device 100 may be designed to simulate the brain structure of human on a computer and may include a plurality of network nodes having weights and simulating the neurons of human neural network. The plurality of network nodes may transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes may be positioned in different layers and transmit and receive data in accordance with a convolution connection relationship. The neural network, for example, may include various deep learning techniques such as deep neural networks (DNN), convolutional deep neural networks (CNN), recurrent neural networks (RNN), a restricted boltzmann machine (RBM), deep belief networks (DBN), and a deep Q-network, and may be applied to fields such as computer vision, voice recognition, natural language processing, and voice/signal processing.

A processor that performs the functions described above may be a general purpose processor (e.g., a CPU), and/or may be an AI-only processor (e.g., a GPU) for artificial intelligence learning.

The memory 25 may store various programs and data for the operation of the AI device 20. The memory 25 may be a nonvolatile memory, a volatile memory, a flash-memory, a hard disk drive (HDD), a solid state drive (SDD), or the like. The memory 25 may be accessed by the AI processor 21 and reading-out/recording/correcting/deleting/updating, etc. of data by the AI processor 21 may be performed. Further, the memory 25 may store a neural network model (e.g., a deep learning model 26) generated through a learning algorithm for data classification/recognition according to an embodiment of the present disclosure.

The AI processor 21 may include a data learner 22 that learns a neural network for data classification/recognition. The data learner 22 may learn references about what learning data are used and how to classify and recognize data using the learning data in order to determine data classification/recognition. The data learner 22 may learn a deep learning model by acquiring learning data to be used for learning and by applying the acquired learning data to the deep learning model.

The data learner 22 may be manufactured in the type of at least one hardware chip and mounted on the AI device 20. For example, the data learner 22 may be manufactured in a hardware chip type only for artificial intelligence, and may be manufactured as a part of a general purpose processor (CPU) or a graphics processing unit (GPU) and mounted on the AI device 20. Further, the data learner 22 may be implemented as a software module. When the data learner 22 is implemented as a software module (or a program module including instructions), the software module may be stored in non-transitory computer readable media that can be read through a computer. In this case, at least one software module may be provided by an OS (operating system) or may be provided by an application.

The data learner 22 may include a learning data acquirer 23 and a model learner 24.

The learning data acquirer 23 may acquire a learning data to classify and recognize data.

The model learner 24 may perform learning such that a neural network model may have a determination reference about how to classify predetermined data, using the acquired learning data. In this case, the model learner 24 may train a neural network model through supervised learning that uses at least some of learning data as a determination reference. Alternatively, the model learner 24 can train a neural network model through unsupervised learning that finds a determination reference by performing learning by itself using learning data without supervision. Further, the model learner 24 may train a neural network model through reinforcement learning using feedback about whether the result of situation determination according to learning is correct. Further, the model learner 24 may train a neural network model using a learning algorithm including error back-propagation or gradient decent.

When the neural network model is trained, the model learner 24 may store the trained neural network model in a memory. The model learner 24 may store the trained neural network model in the memory of the server connected to the AI device 20 through a wired or wireless network.

The data learner 22 may further include a learning data preprocessor and a learning data selector to improve the analysis result of a recognition model or reduce resources or time for generating a recognition model.

The learning data preprocessor may preprocess acquired data such that the acquired data can be used in learning for situation determination. For example, the learning data preprocessor may process acquired data in a predetermined format such that the model learner 24 can use learning data acquired for learning for image recognition.

Further, the learning data selector may select data for learning from the learning data acquired by the learning data acquirer 23 or the learning data preprocessed by the preprocessor. The selected learning data may be provided to the model learner 24. For example, the learning data selector may select only data for objects included in a specific area as learning data by detecting the specific area in an image acquired through a camera of a vehicle.

Further, the data learner 22 may further include a model estimator to improve the analysis result of a neural network model.

The model estimator may input estimation data to a neural network model, and based on an analysis result output from the estimation data not satisfying a predetermined reference, it may make the model learner 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

The communication interface 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like.

The AI device 20 shown in FIG. 3 has been functionally divided into the AI processor 21, the memory 25, the communication interface 27, and the like, but the above-described components may be integrated as one module and it may also be referred to as an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 4:
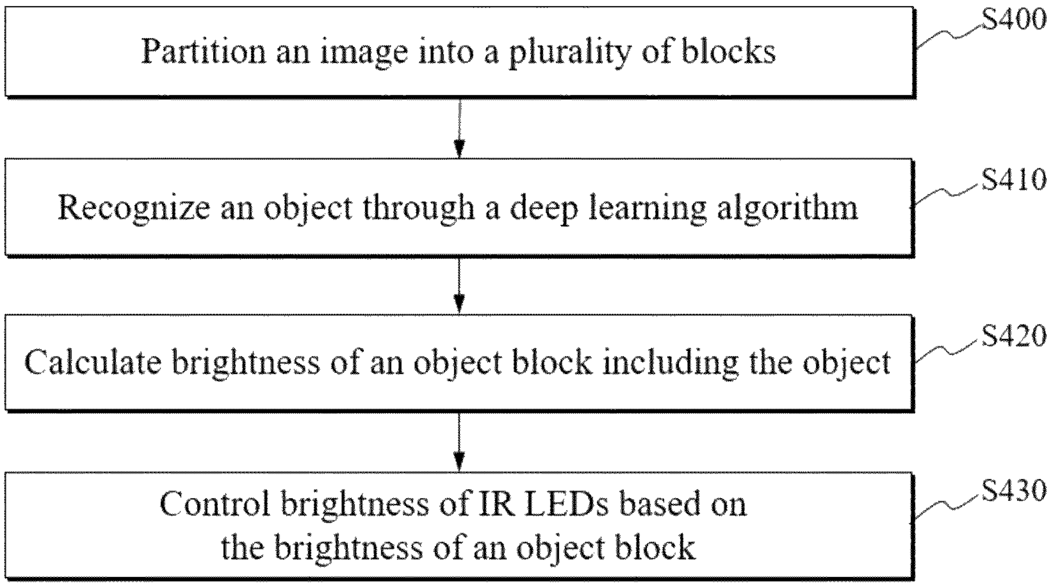
FIG. 4 is a flowchart of a control method for a surveillance camera according to an embodiment of the present disclosure.

FIG. 4 is a flowchart of a control method for a surveillance camera according to an embodiment of the present disclosure. The control method for a surveillance camera shown in FIG. 4 may be implemented through a surveillance camera system described with reference to FIGS. 1 to 3, a surveillance camera, and a processor or a controller included in the surveillance camera. For the convenience of description, it may be assumed that various functions of the surveillance camera control method are controlled through the processor 260 of the surveillance camera 200 shown in FIG. 2; however, it should be noted that the present disclosure is not limited to the specific assumption.

Referring to FIG. 4, the processor 260 may partition the image into a plurality of blocks. The image may be a surveillance camera image S400. The processor 260 may partition the image, formatted to a predetermined size, into a plurality of blocks to detect the location of an object within the image.

The processor 260 may recognize objects in the image through a deep learning algorithm S410. According to an embodiment, the deep learning algorithm may employ the You Only Lock Once (YOLO) algorithm. An embodiment of the present disclosure may provide a control method for a surveillance camera used in low-light environments, for example, an environment with no external light source or an environment where a very weak external light source is available, and thus the object recognition rate is very low. During the training process of an artificial neural network, image data captured in the low-light conditions may be used as input data.

The processor 260 may calculate the brightness of the object block containing the object S420. The processor 260 may identify a block (in what follows, referred to as an object block) containing a recognized object in an image partitioned into a plurality of blocks. The object block may be composed of a plurality of unit blocks. The unit block may be generated in the process of partitioning an image into blocks of unit size, and a unit block may be composed of a plurality of pixels. Here, the brightness of the object block may mean the average brightness of the plurality of unit blocks containing the object. The processor 260 may calculate the average brightness of each unit block and then calculate the average brightness of the object block based on the average brightness of each unit block. The brightness of the object block will be described in more detail with reference to FIGS. 7 and 8.

The processor 260 may control the brightness of IR LEDs so that the brightness of an object block (in what follows, the brightness of a block refers to the average brightness of the block) reaches predetermined reference brightness S430. Here, the predetermined reference brightness may refer to the minimum intensity of light required for object recognition in a low-light environment. The reference brightness may vary depending on factors such as the width of a surveillance site, the number of objects appearing in the surveillance site, and the separation distance between a plurality of objects in the surveillance site, etc. The reference brightness may initially be set to a fixed value during the manufacturing process of the surveillance camera but may also be set to vary depending on the illumination environment of the surveillance camera. The reference brightness may be obtained through model training to calculate the reference brightness based on the artificial intelligence learning model described above. For example, the processor 260 may detect the illumination level of a surveillance site and obtain object recognition rate information from a plurality of images captured while adjusting the intensity of an external light source in the specific illumination environment. Accordingly, an artificial neural network may be trained by defining illumination information and image data as input, performing supervised learning according to a specific object recognition rate, and generating the optimal IR LED brightness information corresponding to a target object recognition rate as output data.

In the description above, FIG. 4 illustrates the overall flow of selectively controlling brightness of specific IR LEDs based on the location of an object according to one embodiment of the present disclosure. The process of controlling brightness of IR LEDs using object block information will be described in more detail with reference to FIG. 5.

Figure 5:
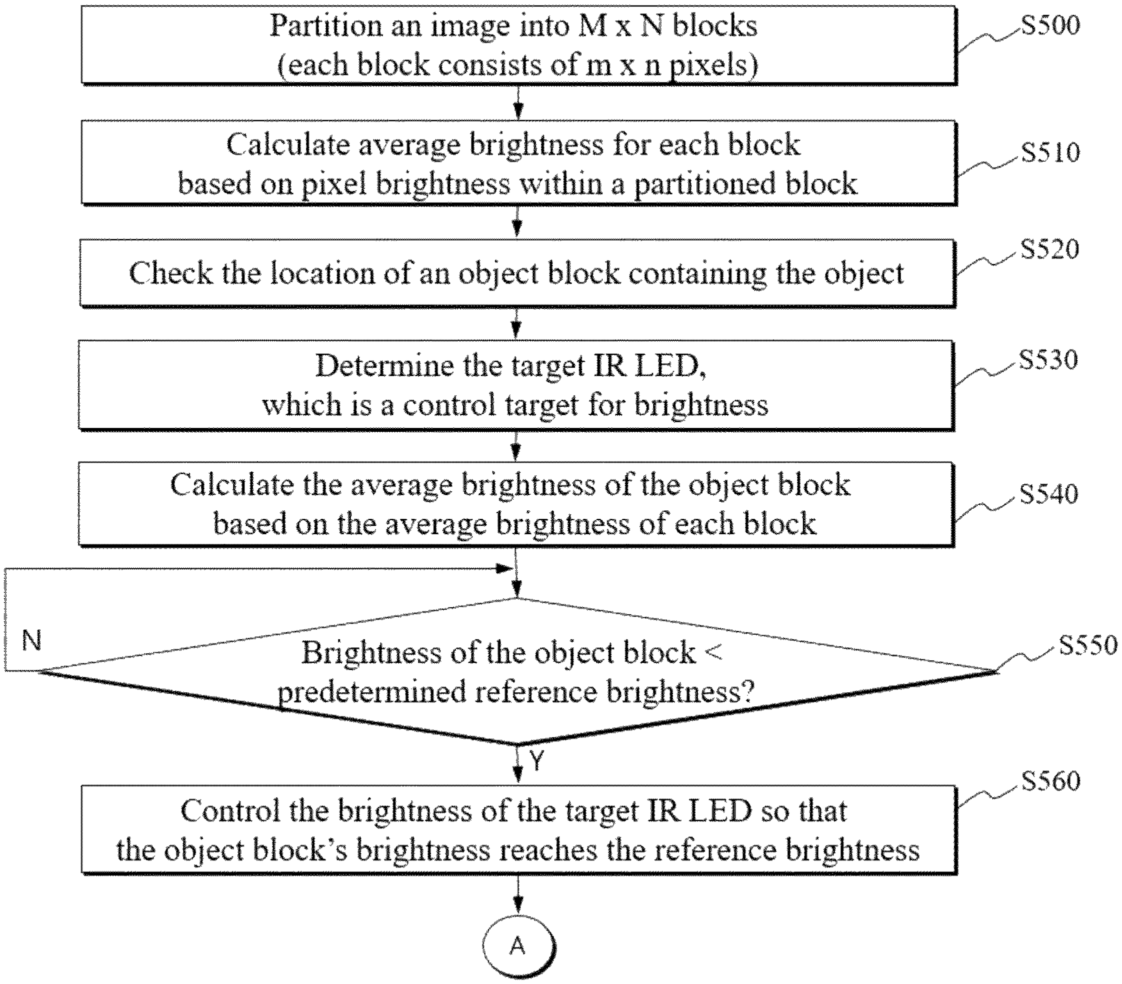
FIG. 5 is a flowchart for selectively controlling brightness of the IR LEDs corresponding to the area in which an object is located according to an embodiment of the present disclosure.
Figure 6A:
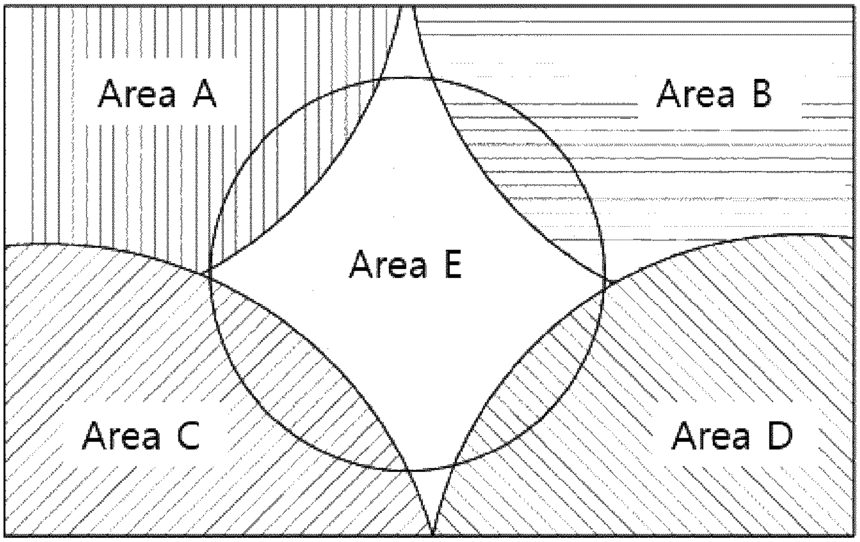
FIG. 6A and FIG. 6B illustrate an example in which brightness control areas are distinguished based on the locations of IR LEDs according to an embodiment of the present disclosure.
Figure 6B:
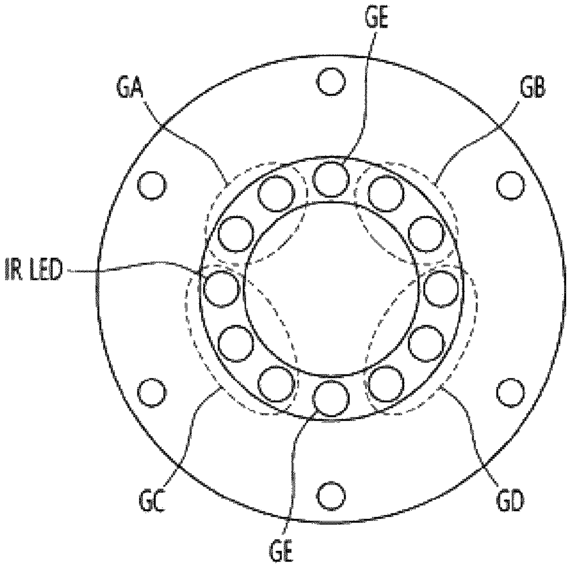

FIG. 5 is a flowchart for selectively controlling brightness of only those IR LEDs corresponding to the area in which an object is located according to an embodiment of the present disclosure. FIGS. 6A and 6B illustrate an example in which brightness control areas are distinguished based on the locations of IR LEDs according to an embodiment of the present disclosure.

Referring to FIG. 5, the processor 260 may partition the image obtained from a camera into M×N blocks S500.

Referring to FIG. 6B, the surveillance camera may have a plurality of IR LEDs disposed around the lens. The disposition shown in FIG. 6B is an exemplary disposition, and the present disclosure is not limited thereto. When the position of an IR LED is adjusted in consideration of the IR LED's illumination area, the processor 260 may divide the area illuminated by the IR LEDs. Here, the illumination area of an IR LED may refer to the area at a specific location (or a specific area) within the surveillance site illuminated by a single IR LED light source when a plurality of IR LEDs are arranged around a circular lens at a predetermined distance from each other. As the separation distance between the plurality of IR LEDs decreases, at least a portion of the illumination areas of the IR LEDs may begin to overlap with each other. Accordingly, IR LEDs with illumination areas that overlap by more than a predetermined portion may be grouped and managed together.

For example, the processor 260 may group and manage a plurality of IR LEDs disposed along the lens of the camera. Grouping and managing may refer to performing brightness control for each group. The criterion for the grouping may be based on the area or location within a surveillance site illuminated by each of a plurality of IR LEDs. In other words, in FIG. 6B, two IR LED light sources included in group A (GA) may refer to the group illuminating area A of the surveillance site (or surveillance video). IR LEDs included in group B (GB), group C (GC), and group D (GD) are groups that may illuminate areas B, C, and D, respectively. Areas A to D may correspond to the corner areas of an image. According to the illustrated example, although the IR LEDs illuminating the central area (area E) rather than the corner areas are physically separated by 180 degrees at the top and bottom of the lens, since their illumination areas overlap in area E, these IR LEDs may be classified into one group (GE).

The number of IR LEDs disposed around the lens may differ from the example shown in FIG. 6B, and the division pattern for the brightness control area shown in FIG. 6A may vary based on the number and disposition of the IR LEDs.

An embodiment of the present disclosure may detect the location of an object in the brightness control area illustrated in FIG. 6A and control the brightness of only the IR LED that illuminates the specific area at which the object is located. The presence or absence and location of a current object may be determined by calculating the position of the object. If the area at which the object is located is selected and the brightness of the corresponding IR LED is increased to the maximum brightness, the selected area may become brighter; however, this may significantly increase power consumption and cause heat problems. Therefore, to control the brightness as efficiently as possible, the brightness may be controlled by determining the AE brightness of the area at which the object is located and readjusting the brightness of the IR LED to an appropriate brightness level.

Figure 7:
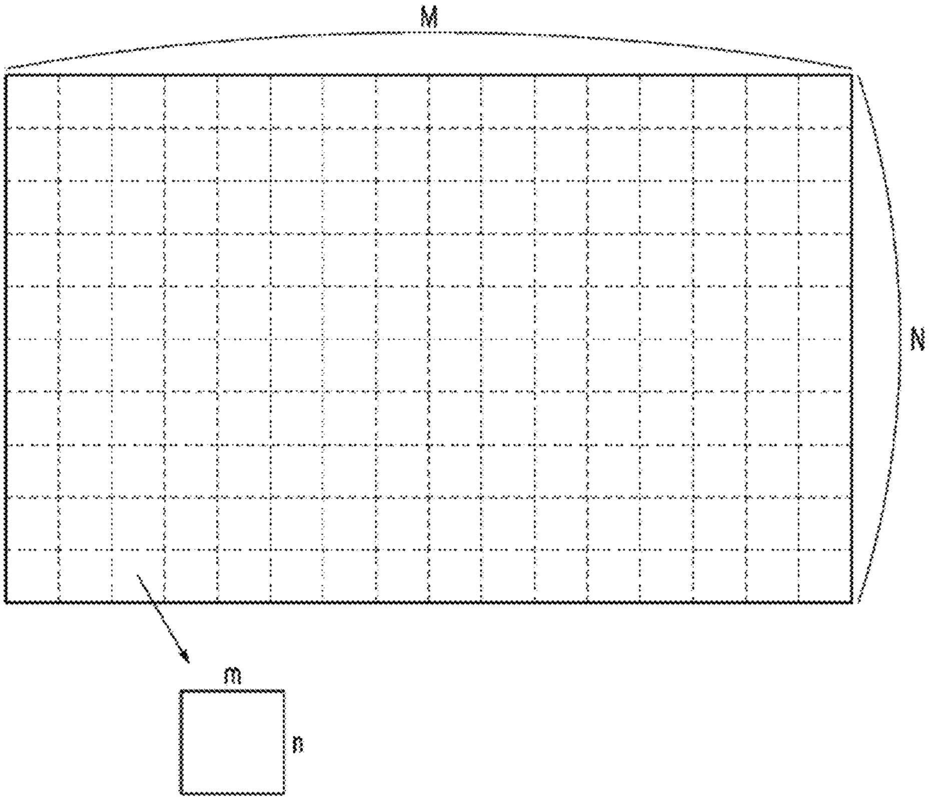
FIG. 7, FIG. 8, and FIG. 9A and FIG. 9B illustrate a method for selectively controlling brightness of only those IR LEDs corresponding to the area in which an object is located through image partitioning according to one or more embodiments of the present disclosure.

To control the IR LED brightness, statistical data on the brightness of each block of an image may be used. With reference to FIG. 7, the process of calculating statistical data for each block of an image will be described. The processor 260 may partition the input image into M×N blocks, with each block including m×n pixels.

Referring again to FIG. 5, the processor 260 may calculate the average brightness for each block based on the pixel brightness within a partitioned block S510. To this end, the processor 260 may check the location of an object block containing the object S520 and determine the target IR LED, which is a control target for brightness, based on the location of the object block S530.

The processor 260 may calculate the average brightness for each block by summing the brightness of all pixels within the partitioned block using Eq. 1 below.

$$\text{Block } brightness_{IJ} = \sum_{i=0}^{m}\sum_{j=0}^{n} Pixel_{ij} / (\text{Number of pixels within block}) \quad \text{[Eq. 1]}$$

(where I=1~M, J=1~N)

Although the processor 260 divides the surveillance camera image into areas, such as those shown in FIG. 6A, objects may be detected randomly in any specific area of the image. Accordingly, the average brightness of all blocks may be calculated using Eq. 1; only the blocks at which an object is detected may be selected, and the average brightness information of the selected blocks may be used.

Figure 8:
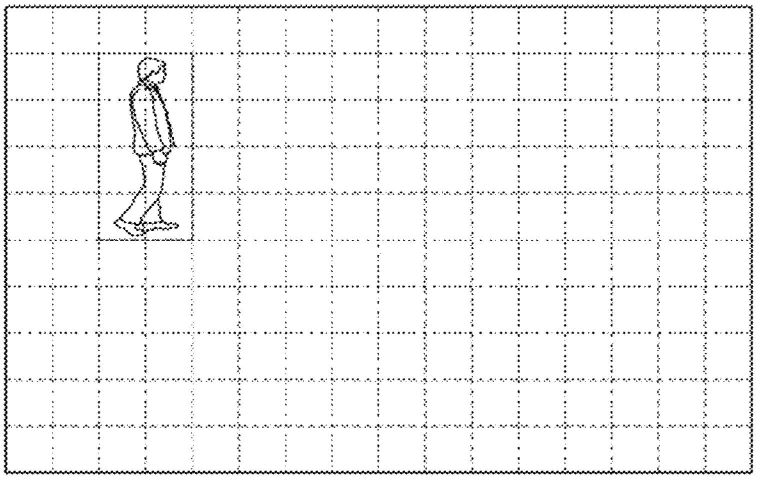

For example, as shown in FIG. 8, there are a total of 8 blocks containing at least part of an object, and the processor 260 may sum the average brightness of each of the 8 blocks and calculate the object brightness by dividing the sum by the number of unit blocks included in the object block.

$$\text{Object brightness} = \frac{\sum \text{Brightness of a block containing an object}}{\text{The number of blocks containing an object}} \quad \text{[Eq. 2]}$$

If the object brightness calculated using the equation above is lower than predetermined reference brightness (S550: Y), the processor 260 may control the brightness of the target IR LED so that the object block's brightness reaches the reference brightness S560.

Here, the control value for brightness of the target IR LED may depend on the object brightness value as described above. Accordingly, camera heating problems caused by high power consumption due to excessive IR LED brightness control may be mitigated. Also, since the IR LED brightness may be automatically increased only in the area at which an object is detected in the image, brightness may be controlled while efficiently reducing power consumption.

Figure 9A:
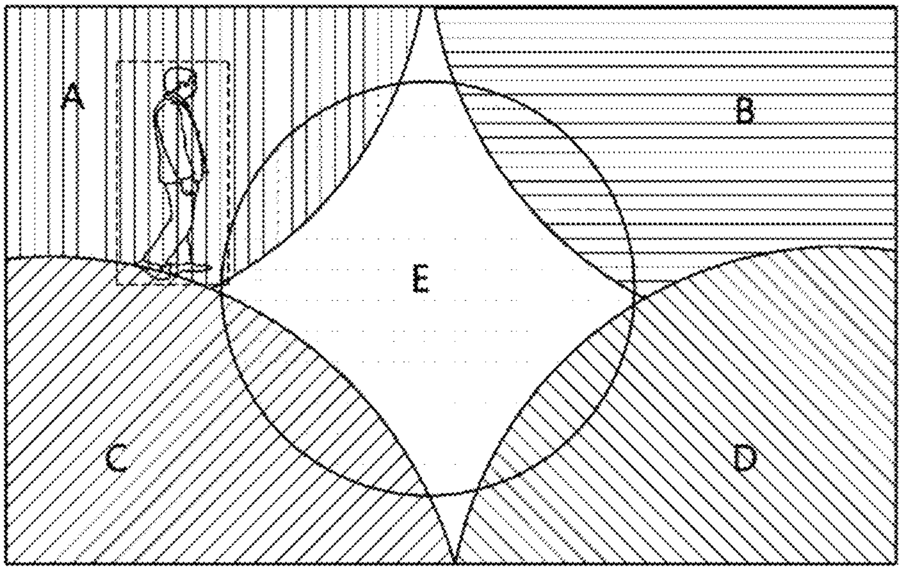
Figure 9B:
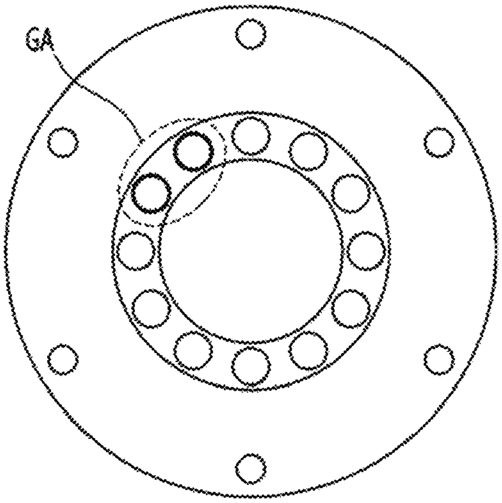

Referring to FIGS. 9A and 9B, the processor 260 may recognize an object in the image and detect the position of an object block containing the object. To control the brightness of the IR LED (GA) responsible for the position of the object block (area A), the processor 260 may calculate the brightness of the object block and control the brightness of the target IR LED (GA) to reach the reference brightness.

Figure 10:
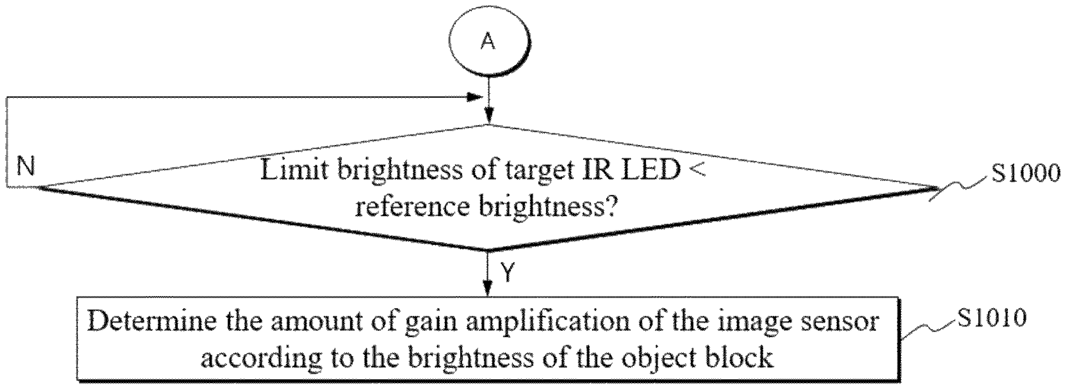
FIG. 10 is a flowchart illustrating an AE control method based on the location of an object according to an embodiment of the present disclosure.

FIG. 10 is a flowchart illustrating an AE control method based on the location of an object according to an embodiment of the present disclosure.

According to an embodiment of the present disclosure, while the brightness of the target IR LED may be controlled to increase, the increase may not exceed the limit brightness of each IR LED, considering the performance of the target IR LED. That is, "limit brightness" may define an upper limit for the brightness at which the target IR LED may perform. Accordingly, the processor 260 may additionally control a predetermined amount of AE amplification based on the AE brightness at the object's position in the image. If the brightness of the target IR LED is less than the reference brightness (S1000: Y), the processor 260 may determine the amount of gain amplification of the image sensor based on the brightness of the object block S1010.

Figure 11:
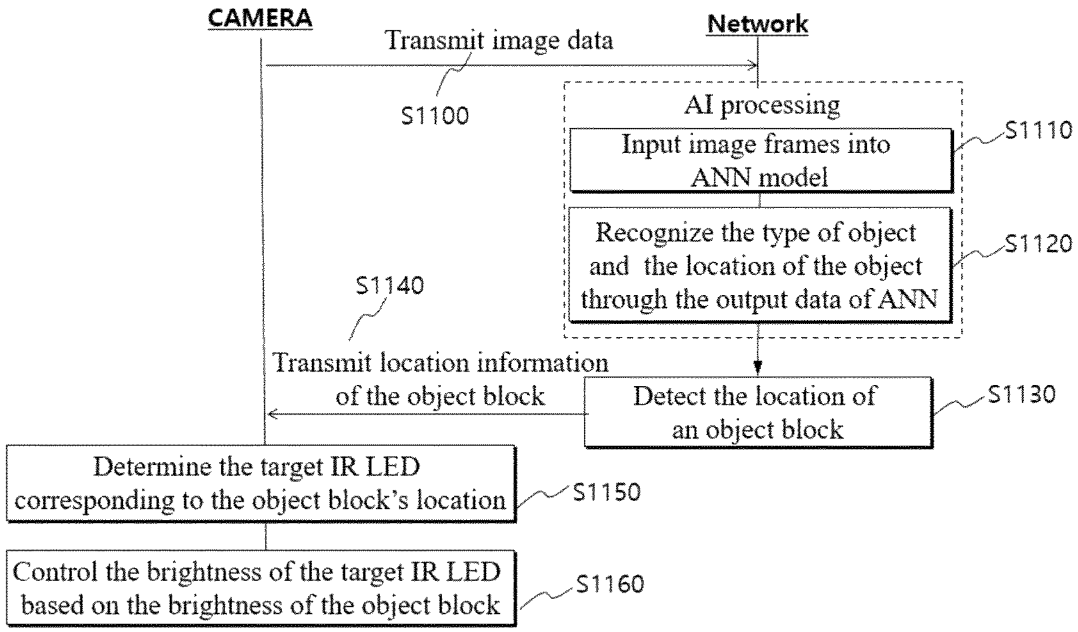
FIG. 11 illustrates another example of controlling brightness of IR LEDs through AI algorithm-based object recognition according to an embodiment of the present disclosure.
Figure 12:
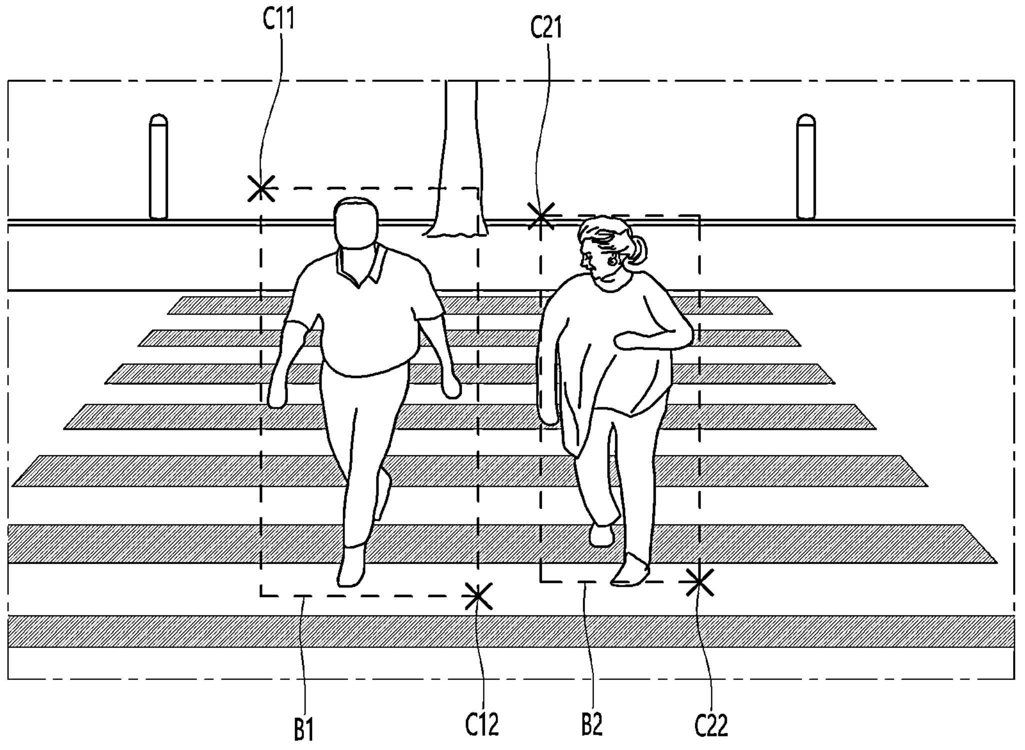
FIG. 12 illustrates an AI-based object recognition result according to an embodiment of the present disclosure.

FIG. 11 illustrates another example of controlling brightness of IR LEDs through AI algorithm-based object recognition according to an embodiment of the present disclosure. FIG. 12 illustrates an AI-based object recognition result according to an embodiment of the present disclosure.

The processor 260 of the surveillance camera may input image frames into an artificial neural network (in what follows, referred to as a neural network) model. The neural network model may be a model trained to use camera images as input data and recognize objects (people, cars, and so on) included in the input image data. As described above, according to an embodiment of the present disclosure, the YOLO algorithm may be applied to the neural network model. The processor 260 may recognize the type of object and the location of the object through output data of the neural network model. Referring to FIG. 12, based on the object recognition results output from the neural network model, IDs (ID: 1, ID: 2) may be assigned to recognized objects, the recognized objects may be indicated using bounding boxes (B1, B2), and the coordinates of the corners (C11, C12/C21, C22) of each bounding box may be determined. The processor 260 may calculate the center coordinates of each bounding box through the corner information of the bounding box.

While the process of recognizing an object through AI processing results by a surveillance camera has been described above, FIG. 11 illustrates a case in which the AI processing operation is performed through a network, namely, an external server.

Referring to FIG. 11, when the surveillance camera obtains an image, the surveillance camera may transmit the obtained image data to a network (e.g., external server) S1100. Here, along with transmission of image data, the surveillance camera may also request information on the presence or absence of objects in the image, and if objects are detected, their corresponding coordinate information within the image.

The external server may determine image frames to be input to the neural network model from the image data received from the surveillance camera through the AI processor, and the AI processor may control the image frames to be applied to the neural network model S1110. Also, the AI processor included in the external server may recognize the type of object and the location of the object through the output data of the neural network model S1120. The external server may detect the location of an object block based on the object location information within the image S1130.

The surveillance camera may receive object recognition results and/or location information of the object block from the external server S1140.

The surveillance camera may determine the target IR LED corresponding to the object block's location S1150, calculate the brightness of the object block, and control the brightness of the target IR LED based on the brightness of the object block S1160.

Figure 13:
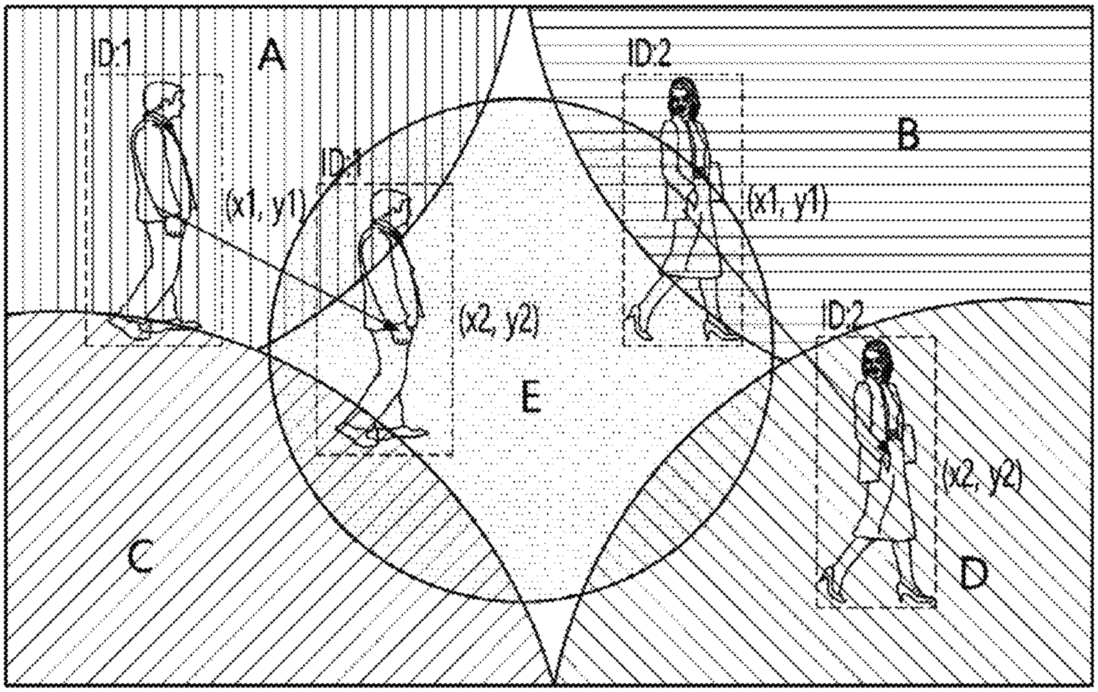
FIG. 13 illustrates a control method for a surveillance camera when an object moves within a surveillance site according to an embodiment of the present disclosure.

FIG. 13 illustrates a control method for a surveillance camera when an object moves within a surveillance site according to one embodiment of the present disclosure.

Referring to FIG. 13, according to an embodiment of the present disclosure, an image may include a plurality of objects, and depending on situations, an object may move from one specific area to another area. The processor may dynamically change the target IR LED among a plurality of IR LEDs depending on the position of the object block in the image. For example, the processor 260 may detect that the object block of a first object (ID: 1) moves from area A to area E, and the object block of a second object (ID: 2) moves from area B to area D. The processor 260 may determine the IR LED of group E and the IR LED of group D as target IR LEDs for brightness control and adjust the brightness of the IR LEDs of each group.

Figure 14:
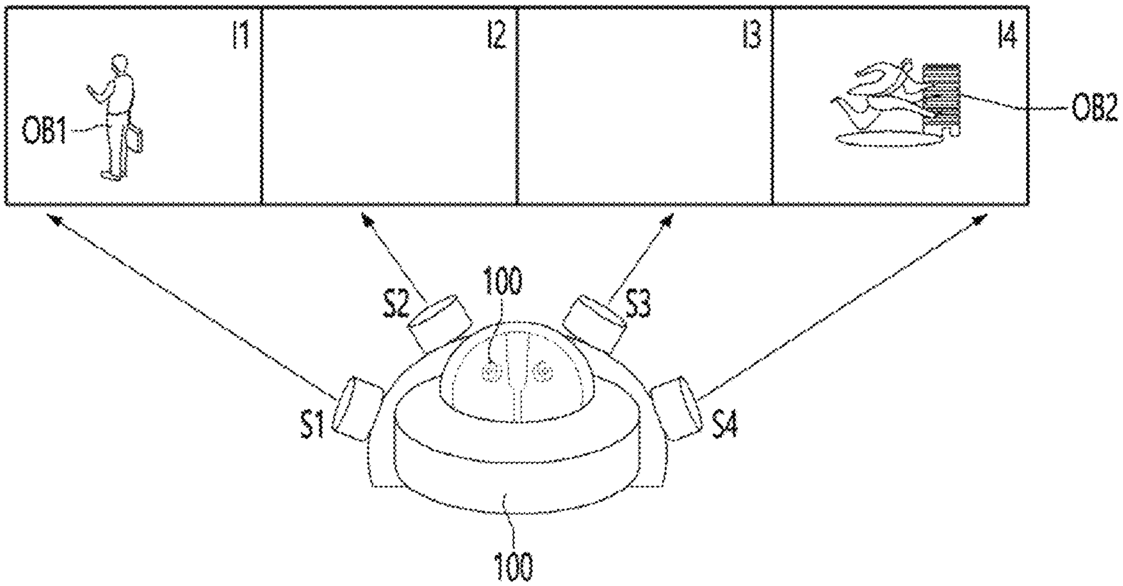
FIG. 14 and FIG. 15 illustrate examples of controlling brightness of IR LEDs provided in a panoramic camera and a multi-direction camera according to one or more embodiments of the present disclosure.
Figure 15:
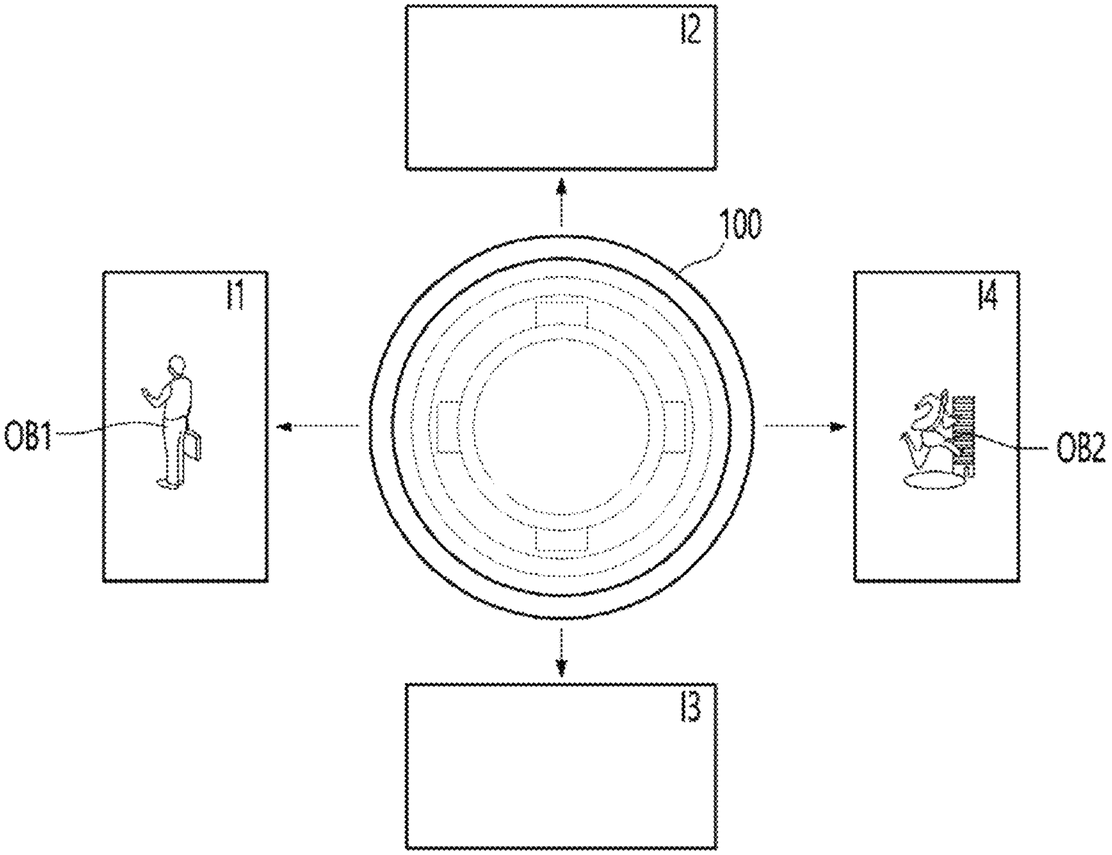

FIGS. 14 to 15 illustrate examples of controlling brightness of IR LEDs provided in a panoramic camera and a multi-direction camera according to one embodiment of the present disclosure.

Referring to FIG. 14, according to an embodiment of the present disclosure, the surveillance camera may be a panoramic camera 100. The panoramic camera 100 may include image sensors S1, S2, S3, S4 oriented in different directions, and each image sensor may be provided with a predetermined array of IR LEDs around the image sensor as described above. When an object is recognized in one of the input images I1, I2, I3, I4 obtained from the respective image sensors S1, S2, S3, S4 based on the method described above, the processor in the panoramic camera 100 may select the image sensor corresponding to the image containing the recognized object as the target IR LED and control the brightness of the IR LED. Also, if the limit brightness of the IR LED is less than reference brightness, the processor may compensate for brightness by amplifying the gain of the image sensor. According to an embodiment, when objects OB1, OB2 are recognized to be present in the first image I1 and the fourth image I4 within the panoramic image, the processor may control the brightness of the IR LEDs around the first image sensor S1 and the fourth image sensor S4 which have obtained the first image I1 and the fourth image I4.

Referring to FIG. 15, according to an embodiment of the present disclosure, the surveillance camera may be a multi-direction camera (in what follows, referred to as a multi-camera) 100. In the multi-camera 100 images I1, I2, I3, I4, presence (recognition) of an object may be checked for each camera area, and brightness may be calculated as described above for the image in which an object is recognized. The processor may control the brightness of IR LEDs for the image sensors corresponding to the images in which the objects OB1, OB2 are recognized. If the processor determines that adjusting the brightness solely by changing the IR LED brightness is inadequate due to the limit brightness of the IR LED, the processor may adjust the brightness by adding a gain value for AE brightness amplification for each image.

According to an embodiment of the present disclosure, the arrangement pattern of IR LEDs installed along or around the lens of the surveillance camera may vary depending on the type of camera; therefore, it should be noted that the arrangement of IR LEDs shown in FIG. 6 is only an example and the present disclosure is not limited to the specific example. Therefore, according to an embodiment of the present disclosure, depending on the type of camera such as a PTZ camera, a fixed dome camera, a fixed box camera, a fixed bullet camera, a special camera, or a panoramic camera, the arrangement of IR LEDs may vary according to a particular combination of the lens and the housing. However, regardless of the camera type, if the arrangement of IR LEDs provides individual illumination areas within a range similar to the example shown in FIG. 6, and at least a portion of each illumination area overlaps with each other, the control method for a surveillance camera according to the present disclosure may be applied.

It should be clearly understood that if the size of an obtained image differs from the size and/or ratio shown in FIG. 6 due to a change in the camera type, the criterion for grouping and managing IR LEDs may be changed accordingly.

According to an embodiment of the present disclosure, the AE amplification gain may be efficiently reduced while maintaining low power consumption by selectively controlling the infrared LEDs and/or AE according to the presence or absence of an object based on the AI-based object recognition result.

Also, according to one embodiment of the present disclosure, the object recognition rate may be increased, and power consumption may be reduced by controlling the brightness of at least part of the infrared LEDs (in what follows, referred to as IR LEDs) provided in the surveillance camera according to the location of an object.

The present disclosure may be embodied as computer-readable code on a medium having a program recorded thereon. The computer-readable recording medium may be all types of recording devices that can store data which can be read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Therefore, the detailed description should not be construed as restrictive in all respects and should be considered as illustrative. The scope of this specification should be determined by reasonable interpretation of the appended claims, and all changes within the equivalent scope of this specification are included in the scope of this specification.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A surveillance camera comprising:

a camera comprising a plurality of infrared light emitting diodes (IR LEDs) corresponding to a plurality of illumination areas; and at least one processor configured to:

partition an image acquired through the camera into M×N blocks, each block comprising a plurality of pixels;

determine an object block comprising at least one block that includes an object among the M×N blocks, determine, for each of the M×N blocks, a first average brightness based on brightness values of a plurality of pixels included in each block, calculate a second average brightness of the object block by summing the first average brightness of only the at least one block included in the object block and dividing the sum by a number of the at least one block included in the object block, determine, based on a location of the object block, at least one target IR LED, among the plurality of IR LEDs, corresponding to an illumination area including the location of the object block, compare the second average brightness of the object block with a predetermined reference brightness, and in response to the second average brightness of the object block being lower than the predetermined reference brightness, control a brightness of at least one target IR LED, such that the second average brightness of the object block reaches the predetermined reference brightness, wherein the predetermined reference brightness refers to a minimum intensity of light required for object recognition in a low-light environment and is obtained through model training by defining illumination information and image data as input data and IR LED brightness information corresponding to a target object recognition rate as output data.

2. The surveillance camera of claim 1, wherein, based on an arrangement of the plurality of IR LEDs, an image capture area of the surveillance camera is divided into a plurality of areas according to respective illumination areas of the plurality of IR LEDs.

3. The surveillance camera of claim 1, wherein the at least one processor is further configured to:

based on a limit brightness of the at least one target IR LED being less than the predetermined reference brightness, compensate for the second average brightness of the object block by amplifying a gain of an image sensor included in the camera.

4. The surveillance camera of claim 3, wherein the at least one processor is further configured to determine an amount of gain amplification of the image sensor according to the second average brightness of the object block.

5. The surveillance camera of claim 1, wherein the at least one processor is further configured to:

based on a location of the object block being recognized in the image, determine the at least one target IR LED corresponding to the location of the object block, and control the brightness of the at least one target IR LED.

6. The surveillance camera of claim 5, wherein the at least one processor is further configured to turn off IR LEDs that are not included in the at least one target IR LED among the plurality of IR LEDs.

7. The surveillance camera of claim 1, wherein the at least one processor is further configured to dynamically change the at least one target IR LED for brightness control among the plurality of IR LEDs according to a location of the object block in the image.

8. The surveillance camera of claim 1, wherein the at least one processor is further configured to:

recognize the object using a deep learning-based object recognition algorithm, assign an identification (ID) to each recognized object, extract coordinates of the object to which the ID is assigned, and match the coordinates of the object to coordinates of the at least one block that include the object.

9. A surveillance camera comprising:

a camera comprising a plurality of infrared light emitting diodes (IR LEDs); and at least one processor configured to:

recognize an object through a deep learning-based object recognition algorithm from an image obtained through the camera, partition the image into M×N blocks, each block comprising a plurality of pixels, determine at least one target IR LED corresponding to coordinate information of the object among the plurality of IR LEDS, determine an object block comprising at least one block that includes the object, determine, for each of the M×N blocks, a respective first average brightness based on brightness values of a plurality of pixels included in each block, calculate a second average brightness of the object block by summing the first average brightness of only the at least one block included in the object block and dividing the sum by a number of the at least one block included in the object block, compare the second average brightness with a predetermined reference brightness, and in response to the second average brightness being lower than the predetermined reference brightness, control a brightness of the at least one target IR LED such that the second average brightness of the object block reaches the predetermined reference brightness, wherein the predetermined reference brightness refers to a minimum intensity of light required for object recognition in a low-light environment and is obtained through model training by defining illumination information and image data as input data and IR LED brightness information corresponding to a target object recognition rate as output data.

10. The surveillance camera of claim 9, wherein the plurality of IR LEDs are provided around a lens of the camera, wherein a surveillance area of the surveillance camera is divided into a plurality of areas in the image according to illumination areas of the plurality of IR LEDs, and wherein the at least one processor is further configured to:

group the plurality of IR LEDs into groups of at least one IR LED corresponding to the plurality of areas, determine a group corresponding to the coordinate information of the object, and control the brightness of the at least one IR LED included in the determined group.

11. The surveillance camera of claim 10, wherein the plurality of areas comprise areas corresponding to corners of the image and an area corresponding to a center of the image.

12. The surveillance camera of claim 9, wherein the at least one processor is further configured to:

calculate the second average brightness of the object block by summing the respective first average brightness of the at least one block included in the object block and dividing the sum by a number of the at least one block.

13. The surveillance camera of claim 12, wherein the at least one processor is further configured to, based on a limit brightness of the at least one target IR LED being less than the predetermined reference brightness, compensate for the second average brightness of the object block by amplifying a gain of an image sensor included in the camera.

14. The surveillance camera of claim 9, wherein the at least one processor is further configured to:

dynamically change the at least one target IR LED among the plurality of IR LEDS according to the coordinate information of the object, and control a brightness of at least one IR LED, not included in the at least one target IR LED, to have a brightness lower than the brightness of the at least one target IR LED.

15. A control method for a surveillance camera comprising:

partitioning an image acquired from a camera comprising a plurality of infrared light emitting diodes (IR LEDs)

corresponding to a plurality of illumination areas into M×N blocks, each block comprising a plurality of pixels;

recognizing an object through a deep learning-based object recognition algorithm;

determining an object block comprising at least one block that includes the object;

determining, for each of the M×N blocks, a respective first average brightness based on brightness values of a plurality of pixels included in each block;

calculating a second average brightness of the object block by summing the first average brightness of only the at least one block included in the object block and dividing the sum by a number of the at least one block included in the object block;

comparing the second average brightness with a predetermined reference brightness; and in response to the second average brightness being lower than the predetermined reference brightness, controlling a brightness of at least one target IR LED, among the plurality of IR LEDs, corresponding to an illumination area that includes the object block such that the second average brightness reaches the predetermined reference brightness, wherein the predetermined reference brightness refers to a minimum intensity of light required for object recognition in a low-light environment and is obtained through model training by defining illumination information and image data as input data and IR LED brightness information corresponding to a target object recognition rate as output data.

16. The control method of claim 15, wherein, based on an arrangement of the plurality of IR LEDs, an image capture area of the surveillance camera is divided into a plurality of areas according to respective illumination areas of the plurality of IR LEDs, and wherein the method further comprises:

obtaining a location of the object and a location of the object block;

determining the at least one target IR LED corresponding to the illumination area that includes the location of the object block among the plurality of IR LEDs; and controlling the brightness of the at least one target IR LED such that the second average brightness reaches the predetermined reference brightness.

17. The control method of claim 16, further comprising:

compensating for the second average brightness of the object block by amplifying a gain of an image sensor included in the camera based on a limit brightness of the at least one target IR LED being less than the predetermined reference brightness.

* * * * *